(12) United States Patent
Holtom et al.

(10) Patent No.: US 6,507,169 B1
(45) Date of Patent: Jan. 14, 2003

(54) ENERGY STORAGE SYSTEM

(75) Inventors: Stephen Wayne Holtom, Castle Hill (AU); Goran Abrahamsson, Dee Why (AU); Anna Norlin, Bronte (AU)

(73) Assignee: Farnow Technologies PTY Limited, Castle Hill (AU)

( * ) Notice: Subject to any disclaimer, the term of this patent is extended or adjusted under 35 U.S.C. 154(b) by 0 days.

(21) Appl. No.: 09/701,692
(22) PCT Filed: Jun. 9, 1999
(86) PCT No.: PCT/AU99/00469
§ 371 (c)(1), (2), (4) Date: Jan. 23, 2001
(87) PCT Pub. No.: WO99/65131
PCT Pub. Date: Dec. 16, 1999

(30) Foreign Application Priority Data

Jun. 9, 1998 (AU) ............................................ PP-3992
Jan. 18, 1999 (AU) ............................................ PP-8260

(51) Int. Cl.⁷ .................................................. H02J 7/60
(52) U.S. Cl. ....................................................... 320/106
(58) Field of Search ................................. 320/106, 134

(56) References Cited

U.S. PATENT DOCUMENTS 5,281,919 A    1/1994   Palanisamy
6,046,920 A *  4/2000   Cazabat et al. ............. 363/136
6,081,098 A *  6/2000   Bertness et al. ............. 320/134

FOREIGN PATENT DOCUMENTS

FR    851569    * 12/1996
SU    851569      12/1979

* cited by examiner

Primary Examiner—Edward H. Tso
Assistant Examiner—Pia Tibbits
(74) Attorney, Agent, or Firm—Andrea L. Mays; Rod D. Baker

(57) ABSTRACT

A power control system (10) for managing power output from a battery (11) includes an output terminal (12) for delivering power from the battery (11) to a load, control means (14) connected to the battery (11) to sense preselected operating parameters of the battery (11), and in a first mode of operation to provide power from the battery (11) to the output terminals (12). A first capacitor (15), which stores a predetermined quantity of power is connected between the control means (14) and the battery (11), supplies its stored power to the battery (11) in response to a signal from the control means (14) which is in a second mode of operation. A second capacitor (16), which stores a predetermined quantity of power and is connected between control means (14) and the output terminals (12), supplies its stored power to the output terminals (12) in response to a signal from the control means (14) in its second mode of operation.

22 Claims, 5 Drawing Sheets

ENERGY STORAGE SYSTEM

FIELD OF THE INVENTION

This invention relates to energy storage systems and more particularly to a battery management system for improving the performance of batteries.

BACKGROUND ART

The battery industry has seen increased demand for battery management technology, primarily due to the consumers' ever-increasing requirements for the convenience of battery-powered portable equipment such as cellular phones and laptop computers. Additionally, the battery industry is seeing a movement toward an increased emphasis on electric motor-driven tools and zero emission vehicles with the primary power source for these new generation vehicles being batteries. This movement is due to rapidly increasing government regulations and consumer concerns about air and noise pollution. Another area which requires high efficiency batteries is energy storage applications such as load-levelling, emergency/standby power and power quality systems for sensitive electronic components.

As a result of the increasing demand of battery-powered equipment, the battery industry is under competitive pressure to produce an ideal cell. An ideal cell is a cell that weighs almost nothing, takes up no space, provides excellent cycle life and has ideal charge/discharge performance and does not itself produce an environmental hazard at the end of its life. The most popular technology utilised by the battery industry is the lead-acid battery, which is being challenged to meet higher energy density, smaller size, better performance levels, longer cycle life and guaranteed recyclability.

Several manufacturers are researching exotic batteries, including nickel-metal-hydride, lithium-ion and the like but generally these types of batteries are too expensive to make their use economically viable at this stage, particularly for one of the fastest growing markets on earth, two/three wheeled passenger vehicles. It is well recognised that battery performance, even that of the existing lead-acid battery, can be improved through proper management of the operating conditions of the battery.

There are several aspects of battery management that are not being adequately addressed at this stage, these include;

(i) protection against overcharge during recharge or regeneration operations, (ii) protection against over discharge during high power draw or long duration operations, (iii) minimisation of the negative effects of internal resistance of the battery, and (iv) the ability to monitor, control and protect individual cells of a battery system, Lead-acid battery chargers typically have two tasks to accomplish. The first is to restore capacity, often as quickly as possible, and the second is to maintain capacity by compensating for self-discharge. In both instances, optimal operation requires accurate sensing of battery voltage and temperature. When a typical lead-acid cell is charged, the lead sulphate is converted to lead and lead dioxide on the battery's negative and positive plates respectively. Overcharge reactions begin when the majority of the lead sulphate has been converted, typically resulting in the formation of hydrogen and or oxygen gas due to the breakdown of the electrolyte, this is typically referred to as "gassing". In vented or valve regulated batteries this leads to a loss of electrolyte and dehydration of the electrolyte will occur, thereby affecting the cycle life of the battery.

The onset of over-charge can be detected by monitoring battery voltage. Over-charge reactions are indicated by a sharp rise in the cell's voltage. The point at which over-charge reactions begin is dependent on the charge rate, and as charge rate is increased, the percent of return capacity at the onset of over-charge diminishes ie. The energy used in overcharging can not be recovered from the battery. Controlled overcharging is typically employed to return full capacity as soon as possible and to attempt to bring an unbalanced battery back into balance, however, at the price of reducing cycle life.

Although several methods are used to recharge batteries, all methods consider the group of individual cells as one unit and do not actually monitor each individual cell of a particular battery, which is vital to provide a true balance within the group of cells. A typical 12 volt battery is comprised of 6 individual 2 volt cells connected in series, within a casing with a main terminal for the primary connections. Typically, battery cells do not perform identically and during charge and discharge functions the cells eventually degenerate to an "out of balance" state.

Two critical aspects of cell life are the upper and lower voltage levels. If a 2 volt cell of a lead-acid battery exceeds approximately 2.6 volts during recharge or regeneration functions it will gas which causes electrolyte dehydration and affects cell life. If the cell voltage drops below approximately 1.6 volts during discharge functions then permanent damage to the surface of the plates can occur. With most conventional charging systems, the battery charger is only connected to the first and last terminal of the series of cells and therefore cannot accurately monitor and protect the individual cells from damage. Typically, a charger only sees and reacts to the accumulated voltage with the result that the good cells are actually over-charged to bring one weak cell up to a high enough voltage for the accumulated total to meet the charger's predetermined requirements. This overcharging, dehydrates the electrolyte and starves the good cells, seriously affecting the cycle life of not only the cells, but the total battery.

The internal resistance of a battery is another factor which greatly affects the charge and discharge capabilities of the battery system. Batteries suffer a number of problems, which result in a loss of performance, however, one of the main limitations is overcoming the internal resistance. Every battery system has an internal resistance but the aim is to minimise the internal resistance and at the same time store the maximum amount of energy per unit weight. When a load is applied to a battery system the required current flows and a drop in battery voltage results due to the internal resistance of the battery. The lower the resistance the lower the voltage drop of the battery. This is due to the total internal resistance of the battery, which comprises of the physical resistance of the components and the resistance due to polarisation such as activation and concentration polarisation.

A significant contribution to the total internal resistance of any battery system is polarisation in its simplistic form, concentration polarisation involves a build up of reactants or products at an electrode's surface, which limit the diffusion of reactants to the electrodes and products away from the electrodes. The higher the current the higher the polarisation losses that can be experienced by a battery system. Therefore, the highest current that can be extracted from battery systems is limited by the degree of polarisation within a battery system. However, if the polarisation losses can be controlled, much higher currents at minimal voltage losses should be obtainable from most battery systems.

It is, therefore, an object of the present invention to provide a power control device for providing a predetermined power output from a battery which significantly reduces the internal resistance losses experienced with most types of batteries.

SUMMARY OF THE INVENTION

According to one aspect of the invention there is provided a power control system for providing a predetermined power output from a battery system comprising:

(i) output means for delivering power from the system to a load, (ii) control means adapted to be connected to the battery system to sense pre-selected operating parameters of the battery system in a first mode of operation, and in a second first mode of operation to provide power from the battery system to the output means, (iii) first capacitor means adapted to store a predetermined quantity of power when said control means is in the first mode of operation, said first capacitor means connected between the control means and the battery system and adapted to supply its stored power to the battery system in response to a command signal from the control means when the control means is in the second mode of operation, (iv) second capacitor means adapted to store a predetermined quantity of power when said control means is in a fist mode of operation, said second capacitor means connected between the control means and the output means and adapted to supply its stored power to the output means in response to a command signal from the control means when the control means is in the second mode of operation.

Preferably, the first and second capacitor means are adapted to store a small percentage of the power being transferred out of the battery.

In one embodiment of the invention, the control means provides the command signals to the first capacitor means and the second capacitor means at a predetermined time interval after the commencement of supply of power from the power control system.

In another embodiment of the invention, the control means is adapted to sense the polarisation level in the battery and the control signals to the first capacitor means and the second capacitor means are initiated when the polarisation level in the battery drops below the predetermined limit.

The stored power in the first capacitor means induces a reverse charge or pulse to excite the electrodes within the battery system at a rate that is proportional to the internal resistance of the battery system as sensed by the control means. The excitation of the surfaces of the electrodes permits greater current flow into and out of the battery and thereby permits greater current draw, faster re-charge and longer cycle life for the battery system.

The control system can be adapted to sense the pre-selected operating parameters of the battery system as a whole or the individual cells comprising the battery system.

The power control device may be adapted to monitor automatically the current flow, temperature, internal resistance and operating performance of the battery. The power control device may be further adapted to monitor each individual cell of the battery system during both the charge and discharge cycles.

According to another aspect of the invention, the power control system as described above may be used to provide a predetermined power input to a battery system from a battery charger.

According to another aspect of the invention there is provided a management system for a battery having at least one cell that has at least a pair of electrodes and which is susceptible to polarisation, said battery management system comprising:

(i) means for monitoring a predetermined parameter of the or each cell that is indicative of the level of polarisation, (ii) means for storing a predetermined amount of the power being transferred into or out of the battery, and (iii) means for inducing a reverse charge or pulse to the electrodes according to the level of polarisation so as to reduce the polarisation loss.

MODES OF PERFORMING THE INVENTION

Figure 1:
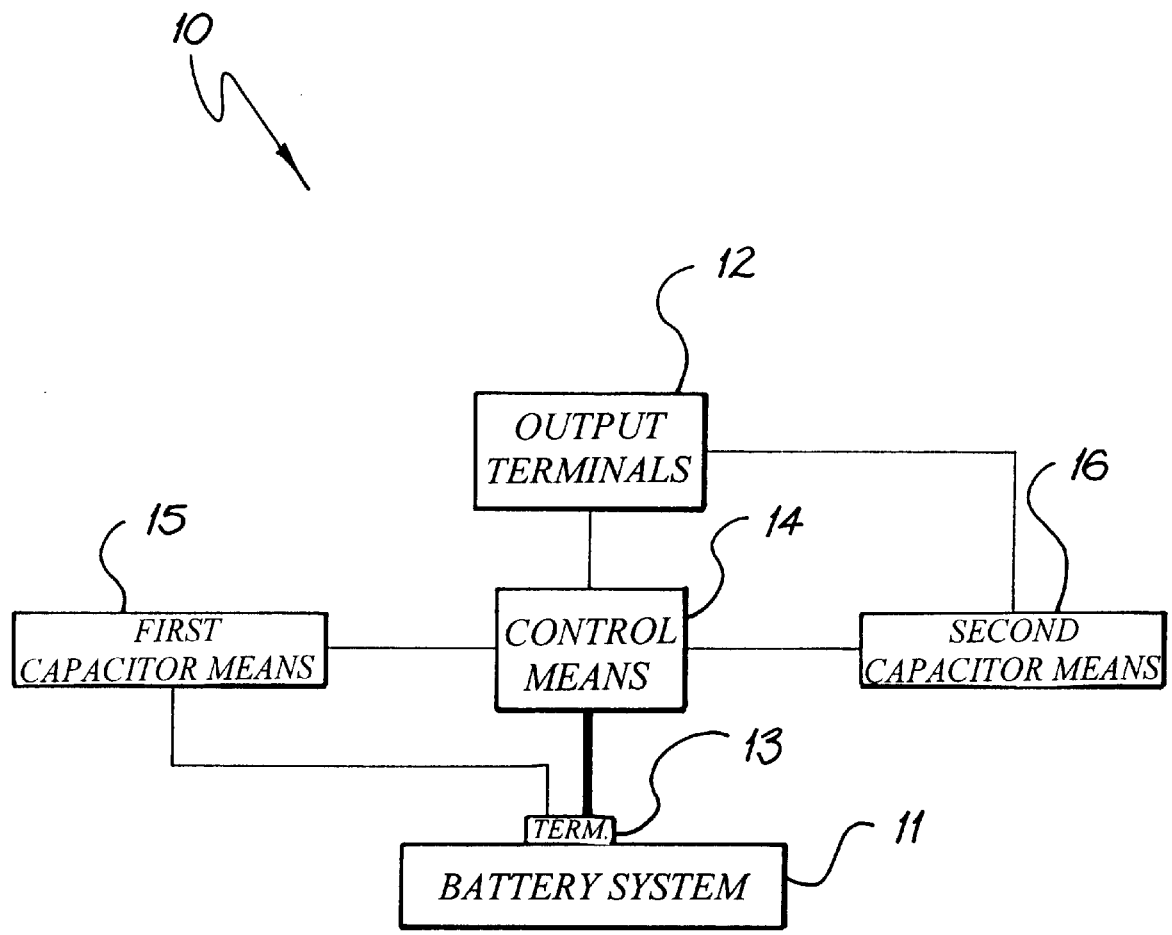
FIG. 1 is a block diagram of a specific power control device for providing a predetermined power output from the battery system according to one embodiment of the invention.

The power control system 10 shown in FIG. 1 is adapted to provide a predetermined power output from a battery system 11 at the terminals or output means 12 to which a load such as an electrical vehicle is connected. Between the output terminals 12 and the terminals 13 of the battery system 11 there is a control means 14 which senses predetermined operating parameters of the battery system 11. The control means 14 supplies power from the battery system 11 to the output terminals 12 during a second mode of operation.

First capacitor means 15 connected between the battery system 11 and the control means 14 stores a predetermined quantity of power from the battery system 11 during the first mode of operation of the control means 14 and supplies its stored power to the battery system 11 in response to a command signal from the control means 14 when the control means is in a second mode of operation.

Second capacitor means 16 which is connected between the output terminals 12 and the control means 14 stores a predetermined amount of power from the battery system 11 when the control means 14 is in its first mode of operation and supplies its stored power to the output terminals 12 in response to a command signal from the control means 14 when the control means 14 is in its second mode of operation.

Thus, the power control system incorporates two capacitor networks and when the control means senses, for example, that the polarisation level in the battery system 11 is too low or that a pre-set time interval has elapsed since power was first supplied to the load, it initiates a back charge to the battery system 11. In this discharge cycle, the control means 14 allows the energy stored in the first capacitor network 15 to charge the battery system 11 and at the same time the second capacitor means 16 supplies uninterrupted power to the output terminals 12. The time interval for this reverse cycle or discharge cycle is very small and as it is very efficient it can be performed at regular intervals.

The reverse charge has the ability to disrupt and minimise the effects and associated losses of polarisation within the battery system.

The power control system may also work in conjunction with a charger to provide optimum performance and battery care at all times during its operation. The power control system may be adapted to prevent an unauthorised type of charger being connected to the battery system thereby preventing a potential abuse and ensuring that the vehicle owner does not attempt to charge the battery system with an incorrect charger at home.

The power control system, the charger and the vehicle may incorporate individual electronic signatures so that the entire system can be tracked and monitored with a high degree of accuracy. Each time a battery system is installed into a charger unit, the power control system will identify itself, the vehicle from which it has been removed as well as the user.

The charger unit may monitor the energy level of the battery and credit the users for this value, add the cost of the exchange, the electricity and a monthly rental for the battery. Upon receipt of this payment either by cash or credit card, a new battery is released and installed into the vehicle. If the client has abused or tampered with the battery anyway this will be identified by the charger.

The control system can be adapted to not only identify the energy level of the battery, but it can also assess the driving range left based on current energy usage levels. Thus, the vehicle driver will know how many kilometers can be travelled on the remaining level of energy.

Each charger unit may be linked via a telemetry system to an operation centre which enables constant monitoring of all stations in the network of charging stations.

The power control system may include the functions and features of speed control modules which means that the vehicle manager can eliminate a speed control device from the vehicle and simply control the output via the power control system. This reduces vehicle costs, reduces manufacturer warranty exposure and can provide continuous performance monitoring via the telemetry communication system.

The power control system may be applied to various battery systems such as valve-regulated lead acid batteries, nickel metal hydride batteries and redox-gel batteries with each system having its benefits and specific target applications.

The power control system may also be used to improve the standby performance of remote area power system, load levelling and emergency back-up battery systems. Stationary battery systems used in remote area power systems and emergency back-up applications may be left fully charged for extended periods. As cells self-discharge at different rates the power control system can be programmed to scan the individual cell conditions periodically and use cell-balancing techniques to balance the cells internally. Alternatively, the charging system may be left on standby and be controlled by the power control system as required.

Figure 2:
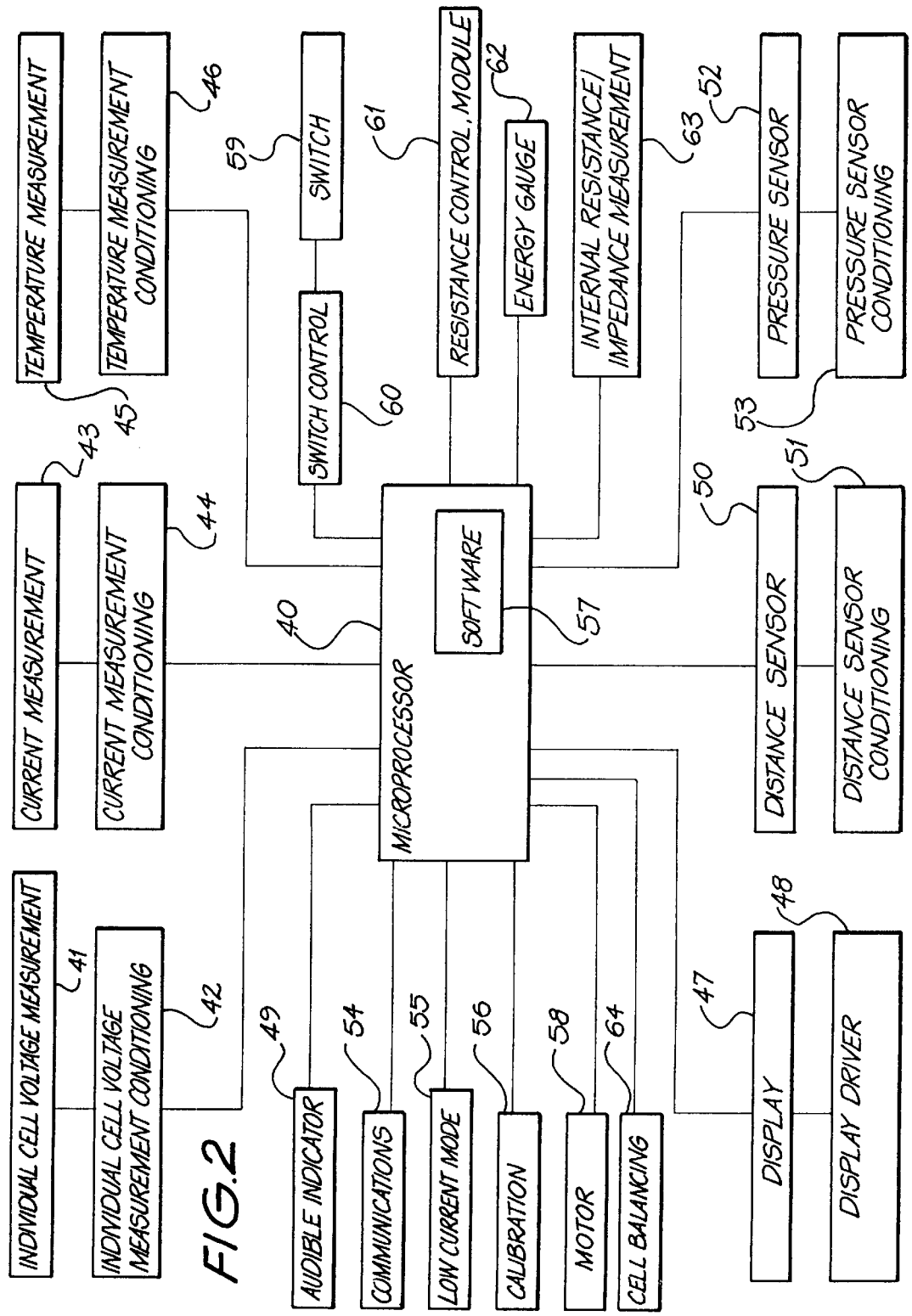
FIG. 2 is a block diagram of a generalised power control device according to a second embodiment of the invention.

A preferred embodiment of the power control system which is shown in FIG. 2 in block form includes a microprocessor 40 and associated software 57 that manages all of the following described functions. In this instance the microprocessor is 8 bit running at 8 MHz, however 4,16, 32 or 64 bit processors can be used. The processor speed could be 4 MHz to 166 MHz. Alternatively a Digital Signal Processing Chip could be used depending on the individual battery requirements. The microprocessor has EEPROM, ROM and RAM Memory. Alternatively an ASIC (Application Specific Integrated Circuit) could be used.

The individual cell voltage measurement module 41 utilises a separate wire connected to the junction of each cell. This wire is used solely for the measurement of voltage. The voltage of each cell is measured with reference to ground for batteries up to 24 Volts. This can also be accomplished using direct measurement of each cell voltage as the needs and accuracy requirements dictate.

Individual cell voltage measurement conditioning is achieved by module 42 which includes a circuit in which the cell voltages are divided by a resistor network and smoothed by a filter capacitor connected across the ground resistor in the divider. Active filtering using operational amplifiers or other filtering means could be used. The voltages are scaled by the divider and filter to a voltage suitable for analog to digital conversion. In this case 4.95 Volts represents the expected maximum voltage of each connection to the battery. A 12 bit analog to digital converter is used for each cell voltage to be measured. The analog to digital converter is controlled serially by the microprocessor which converts each measured voltage to the cell voltage by scaling each voltage and subtracting the voltage of the negative side of each cell from the voltage of the positive side of the cell. This is done for each cell and this method is applicable for cell voltages up to 24 or 30 Volts.

Above 24 or 30 Volts multiple stages of the above method can be used by transmitting the serial digital data by means of optically coupled serial communications thus isolating the cell voltages. Also applicable would be the use of a Voltage to Frequency Converter connected across each cell to directly measure the cell voltage and send this information as a frequency to the microprocessor. These Voltage to Frequency converters can be galvanically or optically coupled to the microprocessor which measures the frequency and converts this to a voltage.

The current measurement module 43 measures the voltage across a shunt resistor and scaling this value using a current sense amplifier with active filtering. An alternative to this would be to use a Hall effect device to measure the current with the appropriate signal conditioning.

Current measurement conditioning is achieved by circuit module 44 in which the voltage measured across the shunt is converted to a 0–5 Volt signal irrespective of the direction of the current which is then fed to an input of the same 12 bit analog to digital converter used for the measurement of voltage described above. The conditioning circuitry also provides a digital input to the microprocessor indicating the direction of current flow. This is achieved via an integrated circuit with minimal external components. Discrete component solutions would also be cost effective in this area.

Temperature is measured by circuit module 45 using an integrated circuit temperature sensor mounted on the circuit board. Any number of these can be used and located in different areas for example the battery, individual cells or outside for ambient temperature.

Temperature Measurement conditioning is achieved by circuit module 46 in which:
  the temperature value is a voltage output and a low offset voltage operational amplifier is used to scale this value to a 0–5 Volt value suitable for connection to an input of the same analog to digital converter used for voltage and current measurement.

A Liquid Crystal Display 47 is used to display information such as capacity remaining, kilometers remaining and any other information.

The display driver 48 is driven directly by the microprocessor 40 by writing the appropriate value to a memory location based on a lookup table stored inside the microprocessor 40. Depending on the microprocessor requirements and LCD complexity a separate integrated circuit driver may be used. A LED or gas plasma display could also be used. A Liquid Crystal display module may also be used.

Audible indicator module 49 includes a piezo electric buzzer which provides audible signal to the user. This is ideally driven directly from the microprocessor or with a transistor driver if necessary.

A distance sensor 50 is mounted on the wheel should the battery be used in a moving vehicle. This sensor 50 can take the form of either a magnetic pickup where the magnet is located on the wheel and a hall effect pickup device is mounted on a stationary part of the vehicle or an optical sensor.

Distance sensor conditioning is achieved by a circuit module 51 in which the output of the distance sensor 50 is a frequency that is scaled and measured by the microprocessor 40 which in turn converts this to a speed or distance value.

Pressure sensor module 52 includes a pressure transducer with a low voltage (in the order of 0–100 mV) output is located in the battery.

Pressure sensor conditioning module 53 scales the output to 0–5 Volts via a precision operational amplifier and fed to the analog to digital converter.

The communications module 54 ensures that all control and communications signals from the battery charger are communicated via a serial bus direct from the microprocessor 40. This serial bus can also access a PC for calibration purposes.

To ensure long battery life all components of the optimiser are chosen for low current consumption. The microprocessor, analog to digital converter, and all other circuitry can be placed in a low current consumption mode by a signal from the microprocessor to the low current mode module 55.

To achieve the required levels of accuracy the analog inputs to the microprocessor are calibrated by the calibration module 56 and the calibration factors and offsets are store in EEPROM memory.

The software 57 is preferably polling orientated as well as being interrupt driven for time critical events such as current monitoring for energy use integration. Preferably, the software can determine if an individual cell is faulty and notify the battery charger.

The software may include a polynomial voltage current algorithm to prevent the battery from over-discharge by opening the switch. The software is adapted to:
(a) calculate the self discharge of the battery and can initiate the cell balancing process,
(b) log the number of cycles and can send this information to the battery charger,
(iii) monitor, communicate and initiate protective measures to prevent overvoltage or under voltage,
(iv) sample current at regular time intervals and integrates current with respect to time to provide ampere hours used and remaining data, and
(v) the amperehours used and remaining is corrected depending on loads during the current cycle.

The microprocessor 40 can also drive FETS or IGBT's to control the current to a motor 58. This can provide a single pulse width modulated control for a brushed type motor, or a quasi sinusoid control with multiple outputs for brushless multiple type motors such as reluctance motors or brushless DC motors.

A FET or IGBT switch 59 is used for security and protection of the battery. FETS with a low on resistance are used.

The switch 59 is controlled by switch control module 60 which is driven by the microprocessor 40 and the drive of the FETS or IGBT's utilises a switched power supply to boost the voltage to enable high side driving.

In the resistance control module 61, the microprocessor controls a FET the function of which is to periodically charge a capacitor to a voltage above the battery voltage and discharge this capacitor into the battery whilst at the same time switch another capacitor whose charge can hold the load current.

The output of an energy gauge 62 is displayed on the LCD display as capacity remaining. This value is calculated by integrating the current over time. Current is sampled at regular intervals and this value is subtracted from an accumulator and then scaled to 100% to give a capacity remaining output.

The internal resistance/impedance module 63 calculated the internal resistance and impedance by means of measuring the change in voltage before and after a step change in current. This can occur both during charge and discharge. AC current or voltage may be injected into the battery and the resultant voltage or current is measured to calculate internal resistance and impedance.

The cell balancing module 64 operates so that when one cell is considered to be self discharged more than others in the group, power is taken from the entire group, converted to an appropriate voltage using a switched mode power converter and distributed to the weakest cell thus balancing the cells.

Conventional lead-acid batteries suffer from limited capacity utilisation, low depth of discharge, short cycle life, low energy density, thermal management problems and the need for constant boost charging to maintain cell equalisation. The lead-acid batteries also require long charge times and high charge currents can only be used for a few minutes at very low states-of-charge. If high currents are used they normally result in higher than allowable voltages being reached leading to electrolyte loss and a reduction in the battery's capacity. The time to recharge a lead-acid battery with boost charging can be up to 4 hours at best if a proper charge profile is followed.

The cycle life of a lead-acid battery varies greatly depending on the depth-of-discharge reached during cycling. For electric vehicle applications a 90–100% DOD (Depth of Discharge) may not by uncommon and at these DOD levels, the cycle life of conventional deep cycle lead-acid batteries would be approximately 300 cycles.

Figure 3:
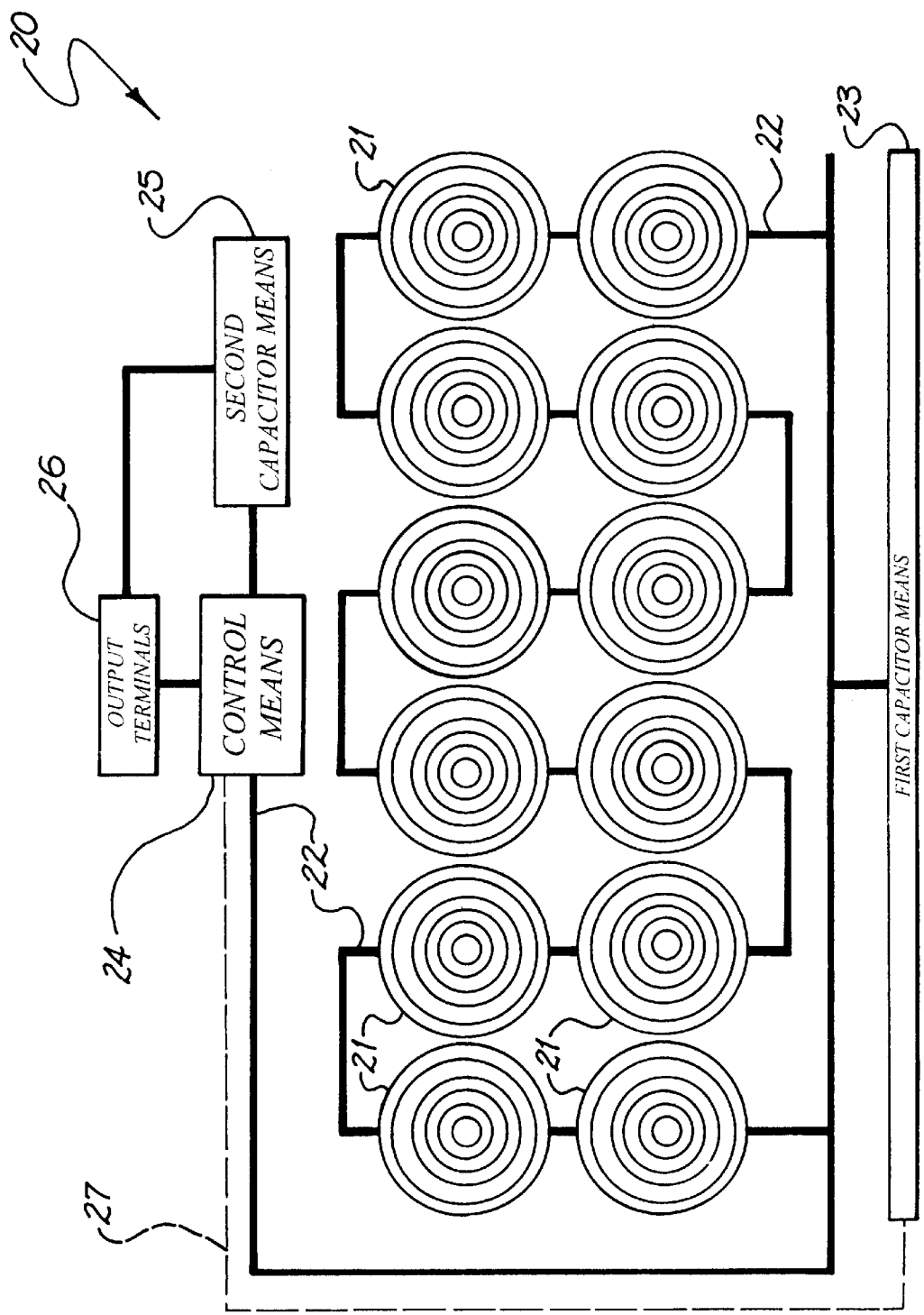
FIG. 3 is a block diagram of the power control system shown in FIG. 1 applied to a lead-acid battery system.

FIG. 3 shows the power control system 20 applied to a lead-acid battery of proven lead-acid format, however, it utilises advanced spiral wound technology for its cell structures. The twelve individual cells 21 are formed from electrodes with surface large areas, which are spiral would to form individual cells with very low resistance. Advanced electrolytes have been developed to assist in allowing very high currents to be extracted from the battery system. The battery system involves the integration of the power control system 20 with the spiral wound cell technology and improved electrolytes. The cells 21 are connected in series by the bus 22 which is also connected to the first capacitor means 23, the control means 24, second capacitor means 25 and output terminals 26. The dotted line 27 represents the command signal from the control means 24 to the first capacitor means 23. The use of a Valve-Regulated lead-acid format offers, a proven technology at a relatively low cost as a starting point for a "rental energy" system.

By utilising the power control system 20 and reconfiguring the battery design to optimise the benefits of these features, there is provided a battery that offers significant improvements in the form of increased current flow, capacity, increased cycle life and reduced recharge times at only a marginally higher manufactured cost.

Figure 4:
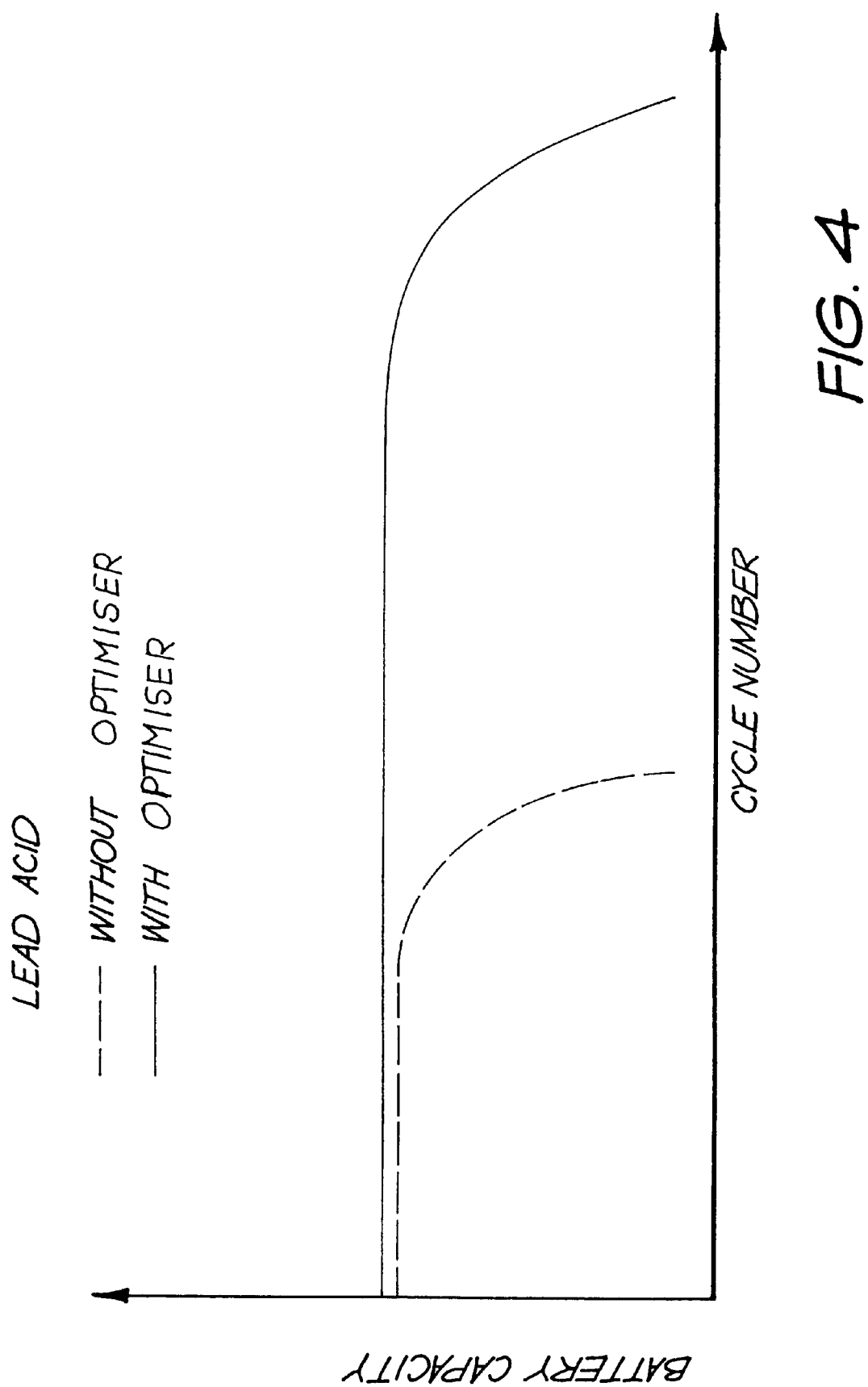
FIG. 4 is a graph of cycle numbers against battery capacity for a lead acid battery with and without the power control system of the invention.

This is demonstrated in FIG. 4 which is a graph of cycle numbers against battery capacity for a lead acid battery with and without the power control system of the invention. A cycle is from charging to discharging and back to charging.

The increased current flow capability means that power and capacity utilisation is improved resulting in a higher obtainable amp-hour rating and the extension of vehicle range. The increased cycle life means that the battery can be recharged more times before replaced, thereby, lowering the annual operating costs. The reduced charging times mean that the battery can be turned around faster, thereby, reducing the number of spare batteries required in the rental energy system.

The power control system may also be applied to conventional NiMH batteries which employ advanced processed and high purity materials that normally lead to a very high cost for the battery systems. Expanded nickel foams with high purity nickel hydroxide compounds and processed metal alloy materials all need a very high degree of quality control in order to obtain a high performance battery.

NiMH hydride batteries can also suffer from self-discharge problems and can also be affected by temperature. On certain systems the extraction of high current can cause damage the battery cells and care must be taken not to over charge the batteries. In this respect, advanced battery chargers are needed to ensure proper charging.

The NiMH battery system of this embodiment utilises advanced NiMH technology that has been designed to take full advantage of the benefits provided by the battery power control system. The cell structure utilises spiral would cell technology allowing the production of cells which have a much higher power output capability. The power control system is integrated into the battery pack cells. The power control system has the ability to significantly reduce polarisation effects allowing the battery system to provide higher current without jeopardising cycle life.

The integrated unit is effectively a stand-alone intelligent energy storage system as the power control system monitors all the unit's functions. The power control system can take active steps to maintain optimal battery performance, at the same time resulting in improved cycle life.

This Ni—MH system is ideally suited for a "rental Energy" system as its benefits include high energy density, high power, long cycle life and quick recharge time. The system will allow greater travelling distances for electric vehicles in comparison to the valve regulated battery system but at a slightly higher cost. The production cost, however, of the system of this embodiment is significantly lower than existing products with estimates at current costs indicating a total price for the NiMH system almost 1/10 the price of current available small production units.

The NiMH system is particularly suitable for electric bicycles where a small battery systems offering long range travel is desirable.

The power control system may also be applied to Redox batteries which have been under investigation for many years. These batteries have mainly been in the form of Redox flow batteries which store energy in liquid electrolytes which are stored separately to the battery stack. During operation, the electrolytes are recirculated through the system and energy is transferred to and from the electrolytes. The redox flow batteries usually suffer from a low energy density and pumping losses associated with recirculating the electrolyte through the system. In certain cases, high self-discharge rates are possible depending on the membranes or if internal shunt currents exist.

The redox gel battery differs from the redox flow principle in that the electrolytes do not need to be re-circulated since the electrolytes are super concentrated gels.

Conventional battery systems employ some form of solid metal electrodes that involve phase transfer reactions. This usually leads to increased weight and loss in efficiencies. The redox gel battery employs super concentrated gels, which contain a high concentration of positive and negative reactive ions in the respective gels. All reactive species are contained in the gels and no phase transfer reactions are involved which leads to high efficiencies due to minimal losses.

The power control system of the invention can be integrated in the Redox gel battery pack to reduce the effects of polarisation. As the gels are super concentrated, polarisation tends to be higher when high loads are applied to the battery system. A power control system specifically designed for the redox gel battery can alleviate many of the constraints in the design of the redox gel cell system.

Figure 5:
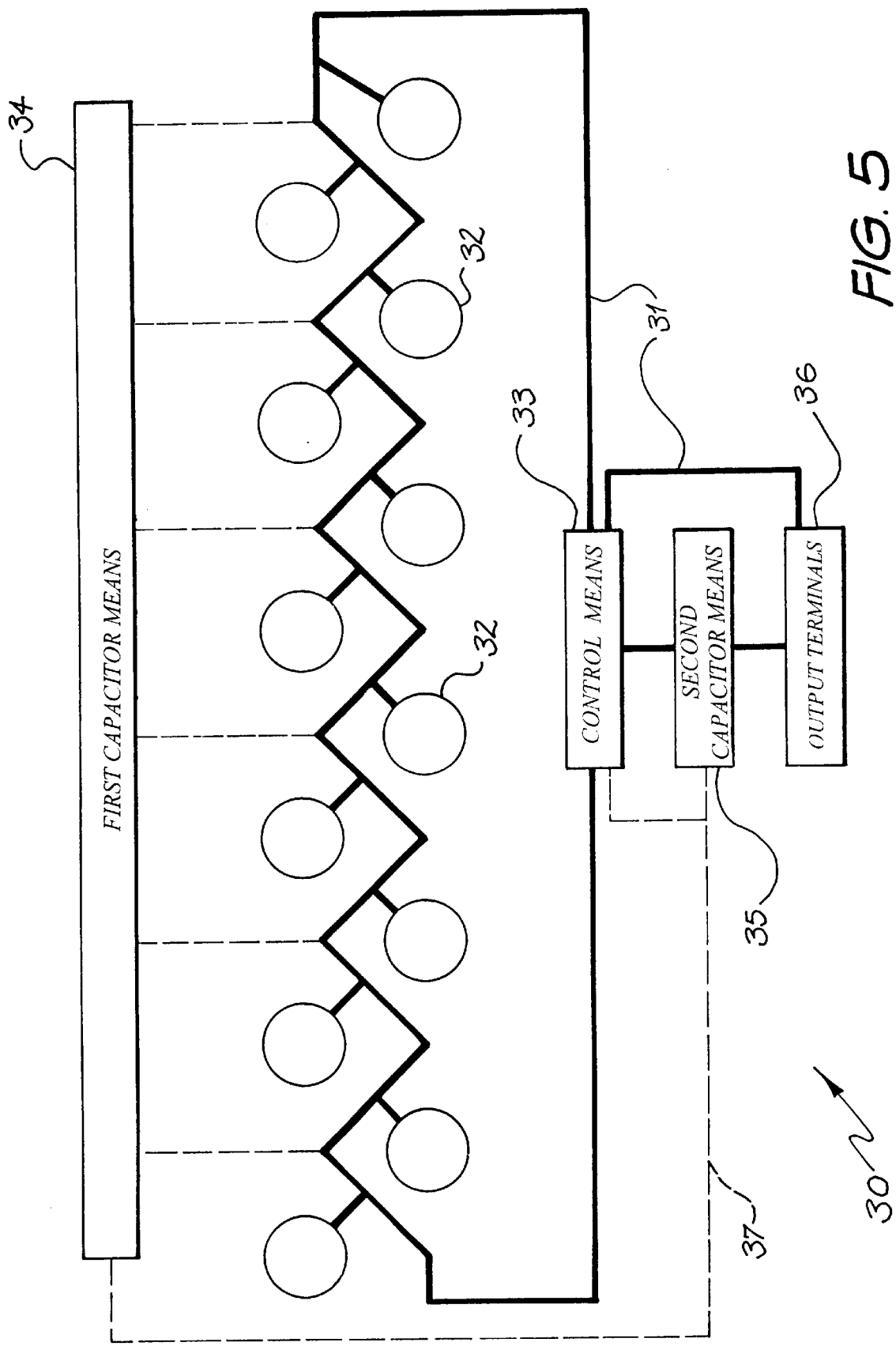
FIG. 5 is a block diagram of the power control device shown in FIG. 1. applied to a Redox-Gel battery system.

The power control system 30 shown in FIG. 5 includes a bus system 31 which inter connects the cells 32, the control means 33, the first capacitor means 34, the second capacitor means 35 and the output terminals 36. Line 37 represents the command signal.

The control means 33 specifically designed for the redox gel cell also performs a number of monitoring functions, such as monitoring the individual cell voltages and temperatures. It can also monitor the internal pressure of the sealed battery pack and ascertain the allowable load limits of the system at any given condition. The control means 33 has the added and important ability to be able to take active steps in maintaining optimal battery performance at any state-of-charge. With this high degree of system control the system can utilise its total capacity repeatedly and over a very long cycle life.

This system is extremely cost competitive and offers superior performance to current available energy storage system. The electrodes employed the redox gel cells simply function to allow the transfer of energy into and out of the gel electrolytes. The electrodes are inert and can be produced from specially developed conducting plastic materials.

This system incorporates the redox gel cells and the power control system to produce an energy storage system that has almost double the energy density of the NiMH system. The system also has very long cycle life due to the stability of the gel electrolytes. The system has a whole is very cost effective. With its lightweight and robustness it is well suited to the battery exchange process for the "rental energy" vehicles.

Another embodiment of the invention relates to a battery charging and conditioning module that integrates with a battery performable power control system, which is integrated into a battery system.

Battery systems suffer a number of problems with one of the main limitations being incorrect charging or gang charging where the overall battery condition is recorded and an applicable charge applied. This concept however does not allow for the condition of individual cells and therefore the highest charged cell us usually overcharged and the lowest charged cell is usually undercharged. The result is that the overall battery life is significantly reduced.

Another problem is that batteries cannot accept high charge currents because of the internal effects if internal resistance on the various components. Fast charging usually has the effect of gassing where hydrogen gas is given off which are not only dangerous but also limits the life of the battery due to electrolyte degradation. This charger works in conjunction with the power control system and limits the internal resistance thereby permitting faster recharge rates without affecting the battery cycle life.

The present invention provides a unique battery charging and conditioning module that integrates with a power control system which is integrated into a battery system. The main function of this power control system is to reduce the polarisation effects due to the internal resistance of the batteries. Importantly, it has allowed control of multiple on-board functions such as monitoring individual cells, providing power output control functions, operating in conjunction with special battery charges providing protection and a conditioning function.

Special battery chargers can identify the power control system and therefore the battery module serial number, which are relayed to the operations centre via a telemetry communications systems. Once the battery has been recorded and the clients account verified, the battery charger is permitted, by the power control system, to commence charging.

The actual charging function is carried out in conjunction with the power control system to ensure that each cell is monitored and treated or conditioned to its specific requirements. This capability prevents damage to cells through undercharging or overcharging and therefore significantly improves the overall battery cycle life.

The battery charger is capable of identifying the type of battery and automatically selects the correct charging format. If an unauthorised battery is installed into the charger it will not permit connection. The charger is also capable, through feedback from the power control system of detecting whether the battery has been charged by any other means or whether the optimisation module or battery have been tampered with in any way and pass this information on to the operations centre.

Each charger unit is linked via a telemetry system to the operations centre, which enables constant monitoring of all stations in the network, plus the location of each battery and status of each account.

INDUSTRIAL APPLICABILITY

The battery management system can be used in a Rental Energy Concept where it is installed into a range of service applications in the form of vending machines, manually installed recharge modules, automatic battery removal and replacement carousels, robotic battery replacement facilities and parking/charging stations.

What is claimed is:

1. A power control system for providing a predetermined power output from a battery system comprising:
   (i) output means for delivering power from the system to a load,
   (ii) control means adapted to be connected to the battery system to sense pre-selected operating parameters of the battery system in a first mode of operation, and in a second mode of operation to provide power from the battery system to the output means,
   (iii) first capacitor means adapted to store a predetermined quantity of power when said control means is in the first mode of operation, said first capacitor means connected between the control means and the battery system and adapted to supply its stored power to the battery system in response to a command signal from the control means when the control means is in the second mode of operation,
   (iv) second capacitor means adapted to store a predetermined quantity of power when said control means is in a first mode of operation, said second capacitor means connected between the control means and the output means and adapted to supply its stored power to the output means in response to a command signal from the control means when the control means is in the second mode of operation.

2. A power control system according to claim 1 wherein the first and second capacitor means are adapted to store less than 50 percent of the power being transferred out of the battery.

3. A power control system according to claim 1 wherein the control means provides the command signals to the first capacitor means and the second capacitor means at a predetermined time interval after the commencement of supply or power to the output means.

4. A power control system according to claim 1 wherein the control means is adapted to sense the polarisation level in the battery and wherein the control signals to the first capacitor means and the second capacitor means are initiated when the polarisation level in the battery drops below a predetermined limit.

5. A power control system according to claim 1 wherein the stored power in the first capacitor means induces a reverse charge or pulse to excite the electrodes within the battery system at a rate that is proportional to the internal resistance of the battery system as sensed by the control means.

6. A power control system according to claim 1 used for management of a battery system wherein the battery of the system is a lead-acid battery.

7. A power control system according to claim 6 wherein the lead-acid battery incorporates spiral wound electrodes and a high energy transfer capacity electrolyte medium.

8. A power control system according to claim 6 wherein the lead-acid battery incorporates compressed plate electrodes which incorporate a high energy transfer capacity electrolyte medium.

9. A power control system according to claim 6 wherein the lead-acid battery incorporates a bipolar cell arrangement.

10. A management system for a battery having at least one cell that has at least a pair of electrodes and which is susceptible to polarisation, said battery management system comprising:
   (i) means for monitoring a predetermined parameter of said at least one cell that is indicative of the level of polarisation,
   (ii) means for storing a predetermined amount of the power being transferred into or out of the battery,
   (iii) means for inducing a reverse charge or pulse to the electrodes according to the level of polarisation so as to reduce the polarisation loss, and
   (iv) means, other than the battery, for supplying stored power to a load when said means for inducing a reverse charge or pulse is inducing said reverse charge or pulse.

11. A battery management system according to claim 10 wherein the predetermined parameter is the internal resistance of said at least one cell.

12. A battery management system according to claim 10 wherein the reverse charge or pulse is induced at a rate that is proportional to the internal resistance and/or energy flow levels of said at least one cell.

13. A battery management system according to claim 10 wherein the battery has a plurality of cells and the monitoring means monitors a predetermined parameter of each cell and the reverse charge or pulse is induced into each cell.

14. A battery management system according to claim 10 and further including means for identifying a battery charger to which the battery has been connected and means for identifying the battery so that the identified battery charger will not charge an unidentified battery.

15. A battery management system according to claim 10 wherein the battery is a nickel-metal-hydride battery.

16. A battery management system according to claim 15 wherein the nickel-metal-hydride battery incorporates spiral wound electrodes and a high energy transfer capacitor electrolyte medium.

17. A battery management system according to claim 15 wherein the nickel-metal-hydride battery incorporates compressed plate electrodes and a high energy transfer capacitor electrolyte medium.

18. A battery management system according to claim 6 wherein the battery is a Redox-Gel battery.

19. A battery management system according to claim 18 wherein the Redox-Gel battery incorporates spiral wound electrodes and a high energy transfer capacity electrolyte medium.

20. A battery management system according to claim 18 wherein the Redox-Gel battery incorporates compressed plate electrodes and a high energy transfer capacitor electrolyte medium.

21. A battery management system according to claim 10 wherein the predetermined parameter is selected from the voltage, current, temperature, pressure, internal resistance or internal impedance of said at least one cell.

22. A battery incorporating the battery management system of claim 10.

* * * * *